United States Patent
Lamon et al.

(10) Patent No.: US 9,808,137 B2
(45) Date of Patent: Nov. 7, 2017

(54) FLOOR TREATMENT MACHINE AND METHOD FOR TREATING FLOOR SURFACES

(71) Applicants: Pierre Lamon, Epalinges (CH); Grégoire Terrien, St-Sulpice (CH); Yannis Jeannotat, Mont sur Rolle (CH); Roland Flück, Oberwangen (CH)

(72) Inventors: Pierre Lamon, Epalinges (CH); Grégoire Terrien, St-Sulpice (CH); Yannis Jeannotat, Mont sur Rolle (CH); Roland Flück, Oberwangen (CH)

(73) Assignee: BLUEBOTICS SA, Ecublens (CH)

( * ) Notice: Subject to any disclaimer, the term of this patent is extended or adjusted under 35 U.S.C. 154(b) by 902 days.

(21) Appl. No.: 14/141,657

(22) Filed: Dec. 27, 2013

(65) Prior Publication Data

US 2014/0190514 A1    Jul. 10, 2014

(30) Foreign Application Priority Data

Jan. 8, 2013  (EP) ..................... 13150493

(51) Int. Cl.
*A47L 11/40* (2006.01)
*G05D 1/02* (2006.01)

(52) U.S. Cl.
CPC .......... *A47L 11/4061* (2013.01); *G05D 1/024* (2013.01); *G05D 1/0219* (2013.01); *A47L 2201/04* (2013.01); *G05D 2201/0203* (2013.01)

(58) Field of Classification Search
CPC ............. A47L 11/4061; A47L 2201/04; G05D 1/0219; G05D 1/024; G05D 2201/0203
See application file for complete search history.

(56) References Cited

U.S. PATENT DOCUMENTS

| 4,674,048 | A | | 6/1987 | Okumura | |
|---|---|---|---|---|---|
| 5,279,672 | A | * | 1/1994 | Betker | A47L 11/305 134/18 |

(Continued)

FOREIGN PATENT DOCUMENTS

| EP | 0142594 A1 | 5/1985 |
|---|---|---|
| EP | 0635773 A2 | 1/1995 |

(Continued)

OTHER PUBLICATIONS

European Search Report for EP13150493 dated Jul. 3, 2013.

(Continued)

*Primary Examiner* — Douglas Lee
(74) *Attorney, Agent, or Firm* — Harness, Dickey & Pierce, P.L.C.

(57) ABSTRACT

A floor treatment machine is disclosed for treating floor surfaces and includes a housing, two drive wheels, at least one support wheel, a drive device, a controller, at least one scan sensor configured to ensure that distance measurements can be carried out in a substantially horizontal plane via a predetermined angular area, and a floor treatment device configured to ensure that the floor can be treated. In at least one embodiment, the controller encompasses a treatment mode, which guarantees a simple and reliable selection of a successful route by way of few driving and storing steps. The boundary of the floor surface is treated as an obstacle. To record the treated surface, starting and end points of route segments, which have been followed, and one of the states "completely treated" or "incompletely treated" for the end points as well as direction information is stored.

20 Claims, 8 Drawing Sheets

(56) References Cited

U.S. PATENT DOCUMENTS

| | | | |
|---|---|---|---|
| 5,353,224 A | 10/1994 | Lee et al. | |
| 5,696,675 A | 12/1997 | Nakamura et al. | |
| 5,841,259 A | 11/1998 | Kim et al. | |
| 6,830,120 B1 | 12/2004 | Yashima et al. | |
| 8,060,254 B2 | 11/2011 | Myeong et al. | |
| 2002/0189045 A1 | 12/2002 | Mori et al. | |
| 2004/0187249 A1* | 9/2004 | Jones | A47L 5/30 15/319 |
| 2004/1210359 | 10/2004 | Herz et al. | |
| 2005/0000543 A1 | 1/2005 | Taylor et al. | |
| 2008/0221729 A1* | 9/2008 | Lavarec | G05D 1/0219 700/245 |
| 2009/1228166 | 9/2009 | Durkos et al. | |
| 2010/0037418 A1* | 2/2010 | Hussey | A47L 5/30 15/319 |

FOREIGN PATENT DOCUMENTS

| | | |
|---|---|---|
| EP | 1265119 A2 | 12/2002 |
| EP | 1557730 A1 | 7/2005 |
| EP | 1903413 A2 | 3/2008 |
| FR | 2861856 A1 | 5/2005 |
| WO | WO-03/014852 A1 | 2/2003 |

OTHER PUBLICATIONS

Schmidt, G. et al. "An Advanced Planning and Navigation Approach for Autonomous Cleaning Robot Operations" International Conference on Intelligent Robots and Systems. Oct. 1998.

* cited by examiner

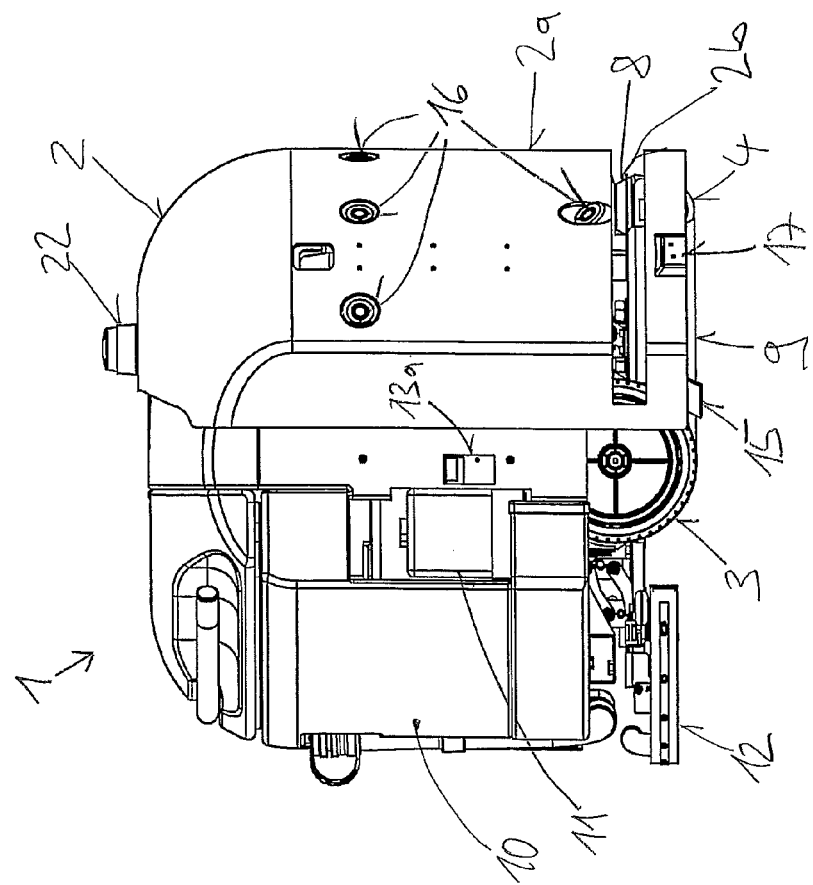
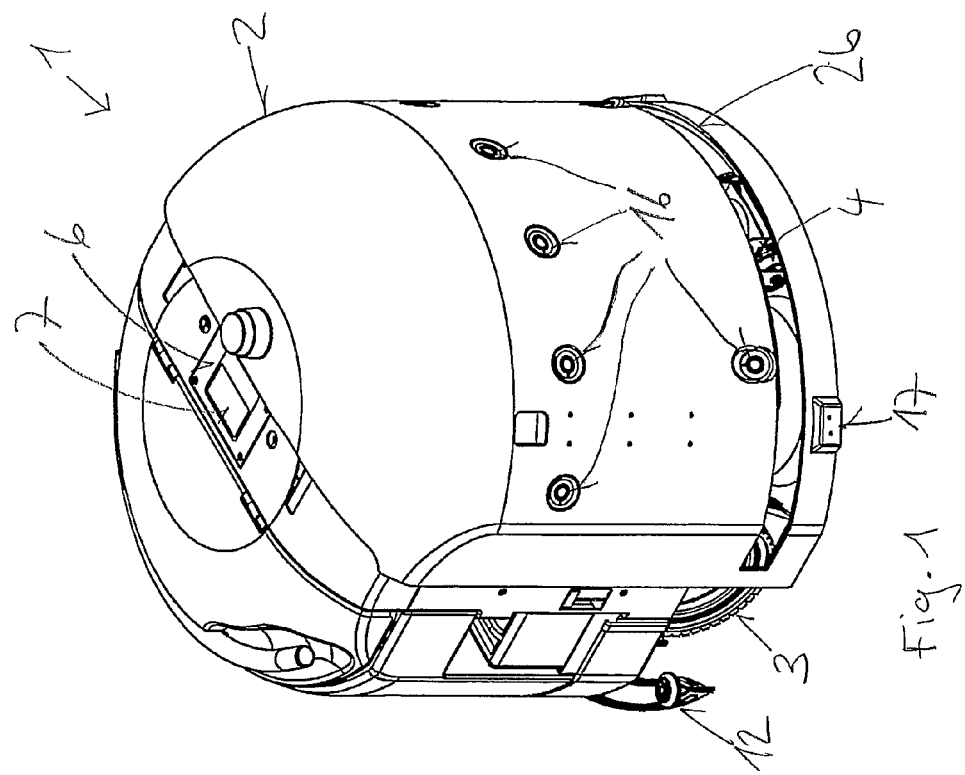

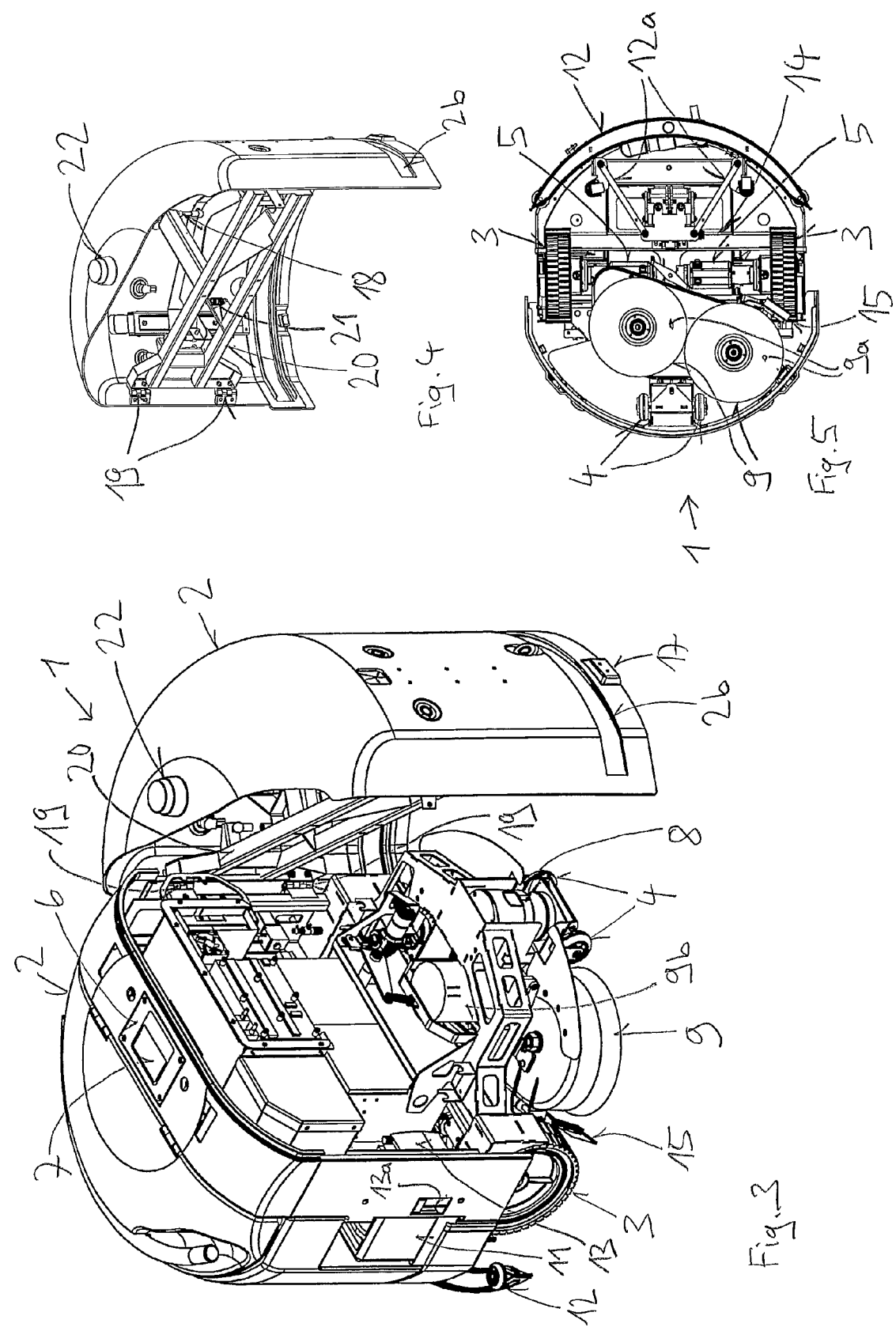

FLOOR TREATMENT MACHINE AND METHOD FOR TREATING FLOOR SURFACES

PRIORITY STATEMENT

The present application hereby claims priority under 35 U.S.C. §119 to European patent application number EP 13150493 filed Jan. 8, 2013, the entire contents of which are hereby incorporated herein by reference.

FIELD

At least one embodiment of the invention generally relates to an automatic floor treatment machine and/or to a method for treating floor surfaces and/or to a computer program product, which initiates the execution of a method on a program-controlled floor treatment machine.

At least one embodiment of the invention relates in particular to machines and to methods for treating floors, the treated floor surface of which is limited by fixed elements, such as the wall sections bordering the floor surface or elements, such as columns, inner wall sections or fixed shelves, which are arranged on the floor surface, and, if applicable, by replaceable elements.

BACKGROUND

Many solutions are known from the state of the art, in the case of which automatic floor cleaning machines carry out cleaning processes on floors of buildings independently. There are two approaches, which have their own individual character. In the case of the first approach, the floor surface is traversed at random, for example in that a random change of direction is chosen when striking an obstacle. Due to the fact that a map of the room, which is to be cleaned, and a plan for an advantageous cleaning route is not created, the required storage capacity is small, but the effort for the processing movement is very high. Many areas are traversed several times and a long cleaning time must be provided for cleaning as completely as possible. This method is not suitable for professional cleaning.

In the case of the second approach, the floor surface is mapped as accurately as possible and an advantageous route is determined. It must be controlled that the planned route is followed in response to the cleaning. In addition, a solution for bypassing obstacles and the subsequent location of the planned route must be provided. These solutions use grids for storing the map of the room, for planning the cleaning route and for storing the cleaned areas. Due to the fact that the resolution of the grid must be as small as possible, correspondingly large amounts of data quantities must be stored and processed.

U.S. Pat. No. 5,279,672 describes a cleaning robot, which comprises a housing, two drive wheels, two support wheels, rotatable cleaning brushes on the front side, comprising a cleaning liquid supply, a suction device for extracting the contaminated cleaning liquid on the rear side. A control device comprising sensors is used to control the movement of the cleaning robot. An infrared laser scanner, which reads barcode information from the reflecting targets, which are arranged on the room boundaries, is arranged on the upper side of the cleaning robot. The reflecting targets make it possible for the cleaning robot to determine its position and the current cleaning area by means of a triangulation. For accurately detecting the position, the laser scanner must detect the angular position of at least 3 different targets simultaneously. Without recognizing three targets, the robot continues to drive for a predefined distance and if it has then still not detected three targets simultaneously, it discontinues the cleaning operation and transmits an alarm signal. When the robot can detect its position and the cleaning area, it must follow a previously programmed cleaning plan, wherein, when approaching an adjustable obstacle or element, respectively, the robot attempts to bypass said obstacle. This solution has the disadvantage that the targets with their barcodes must first be mounted and that a cleaning plan must additionally be programmed for each room. In the event that mobile elements are placed in front of targets, the cleaning robot can no longer clean automatically.

EP 0 635 773 B1 describes a method for creating an environment map and for determining a position for mobile units, which move in an unknown environment. To correct the position of the mobile unit in the environment map and the position of a landmark in the environment map, a certain distance to the landmark is predicted starting at a certain position based on the movement history, and a certain distance to the landmark is measured based on the current position. The difference between the predicted and the measured distance to the landmark is identified as system error. Knowing the uncertainty, which occurs in response to determining the position of the mobile unit and in response to determining the location of the landmark, the system error is divided in the ratio thereof and is used to correct the position of the mobile unit and of the location of the landmark in the environment map. Uncertainties during the movement of the mobile unit can thus be reduced. Even though the mounting of targets is foregone herein, the orientation nonetheless takes place on narrowly bounded landmarks, which can often be covered in rooms comprising movable obstacles.

EP 1 903 413 A2 describes the creation of a map, wherein occupied points are entered into a grid and the thickness of the obstacles and of the wall are increased in accordance with the expansion of the robot, so that the robot can be moved on the map as a point without an expansion. A map, on which the room boundaries are entered as occupied grid points, always has an inaccuracy in accordance with the cell size of the grid and leads to large data quantities, because the grid must be sufficiently fine, so that the boundary can be entered to a sufficiently accurate extent. A further disadvantage of the described solution is that the controller of the robot determines a cleaning direction and that a defined route must be driven in accordance with the predetermined cleaning direction. To carry out these steps, the controller must store large data quantities and must make extensive calculations.

U.S. Pat. No. 8,060,254 B2 also describes distance measurements for bordering a room to obtain grid points. Feature points are extracted from the grid points of the boundary. A position estimate and feature points are updated by means of a simultaneous localization and map building algorithm (SLAM). A sweeping direction is determined from the most frequent direction of the boundary and the grid is placed according to the sweeping direction. A map, on which the room boundaries are entered as occupied grid points, always has an inaccuracy according to the cell size of the grid and leads to data quantities, which are undesirably high. A further disadvantage of the described solution is that a cleaning direction must be determined from the boundary or from the map, respectively.

EP 1 557 730 A1 describes a solution, in the case of which the processing device creates a grid map of the room and divides the room into a plurality of partial segments, which are then processed subsequently by means of a predetermined movement pattern. The position of the processing device is thereby determined by means of reference points, which were determined from the outer contour of the room. The data effort for the map and the provision and control of the movement pattern is also very extensive herein.

In stores, it is possible for display stands, guide signs, pallets, containers or products to be arranged directly on other areas of the floor surface again and again. Accordingly, completely different free floor surfaces are to be expected again and again for the cleaning in predetermined time lags. The solutions for the professional automatic cleaning, which are known from the state of the art, would have to newly map the respective new situations again and again, which is associated with an unreasonable effort. This is why automatic cleaning devices are not used in stores.

Automatic floor treatments are not limited to cleaning. For example, a treatment, such as the polishing of the floor surface or the application of a surface coating, can also be carried out by an automatic floor treatment machine. The term floor treatment also includes controlling the floor surface or carrying out measurements, respectively, on the entire floor surface. Such measurements can be associated with treatments on selected locations. Floor surfaces do not only refer to surfaces in rooms, but also to surfaces outside, wherein positioning areas can then surely be provided for the position determinations instead of the walls, columns or other orientation elements, so as to carry out distance measurements thereon. The floor treatment outside can comprise everything ranging from mowing lawn, working soil, fertilization, sowing, weed treatment, harvesting, to searching for metal parts or even mines.

SUMMARY

The task according to at least one embodiment of the invention now lies in finding a simple solution, which is associated with the smallest possible effort for the detection, the storing and for the treatment movement. The solution, in at least one embodiment is to also be suitable for floor surfaces, which comprise elements, which can be moved on a large surface portion and which can thus be positioned variably when a treatment is executed.

At least one embodiment is directed to a floor treatment machine; at least one embodiment is directed to a method and at least one embodiment is directed to a computer program product. The dependent claims describe alternative or advantageous embodiment alternatives, respectively, which solve further tasks.

A method, according to at least one embodiment of the invention, comprises: determining a treatment direction with a forwards and backwards orientation,
providing driving lines, which are spaced apart from one another, perpendicular to the treatment direction,
following route segments on driving lines from starting points to end points,
determining opposite driving directions on adjacent driving lines,
determining end points, when it is not possible to continue to drive on the respective driving line due to an obstacle, which is detected by an obstacle recognition device,
storing the starting point as well as the end point of the route segment, which was followed and one of the states "completely treated" or "incompletely treated" as well as additionally storing a direction information at least in the case of "incompletely treated", wherein it becomes clear from the direction information, in which direction incompletely treated areas are present, starting at the corresponding end point, said storing being carried out for each end point and is made on a route segment storage,
the contour-following movement, which is triggered at the end points for finding respective new starting points, in the case of which the floor treatment machine follows the obstacle, until it encounters a driving line, wherein
the contour-following movement starts in the direction of the respective current orientation of the treatment direction,
when encountering the driving line, which was followed prior to the contour-following movement, on a route segment, which, according to the route segment storage, has not yet been followed, a new starting point is determined at that location and the driving direction of this driving line is maintained,
when encountering an adjacent driving line on a route segment, which, according to the route segment storage, has not yet been followed, a new starting point is determined at that location and the driving direction of the adjacent driving line is chosen,
when encountering a driving line on a route segment, which, according to the route segment storage, has already been followed, the end of a group of route segments, which run next to one another, is determined, wherein the controller then looks for an end point comprising the state "incompletely treated" in the route segment storage and approaches it with a position search movement, so as to tackle a new group of route sections, which run next to one another, starting at this end point in the orientation of the treatment direction stored for this end point, until no end point comprising the state "incompletely treated" is present any longer.

An embodiment is directed to a computer program product, which initiates the execution of a method on a program-controlled floor treatment machine.

Finally, a floor treatment device of at least one embodiment is embodied as cleaning device, preferably comprising at least one brush, a cleaning liquid supply and a suction arrangement, but if necessary comprising a dry vacuum, or a spray suction device or a sweeper. At least one tank and at least one pump must be provided for the cleaning liquid. Preferably, there is one tank for cleaning liquid or water comprising a cleaning agent, respectively, and one tank for the cleaning agent, which is added to the water. To be able to forego a frequent replacement of the cleaning liquid, a membrane is assigned to this tank. The membrane serves as flexible wall between fresh and dirty water, wherein the available space is divided for fresh and dirty water, as needed. The drive device comprises at least one battery and at least one drive motor. The controller comprises a display and an input device, preferably a touch screen. To be able to turn off the floor treatment machine quickly in case of an emergency, a well-visible emergency stop switch is also provided.

BRIEF DESCRIPTION OF THE DRAWINGS

The drawings explain the invention by way of an example embodiment, to which the invention is not limited, however.

FIG. 1 shows a perspective illustration of an automatic cleaning machine,

FIG. 2 shows a lateral view of an automatic cleaning machine,

FIG. 3 shows an illustration according to FIG. 1, but with a housing front, which is swung upon, FIG. 4 shows a perspective illustration of the housing front, which can be swung open, FIG. 5 shows a bottom view of the automatic cleaning machine.

DETAILED DESCRIPTION OF THE EXAMPLE EMBODIMENTS

Figure 6:
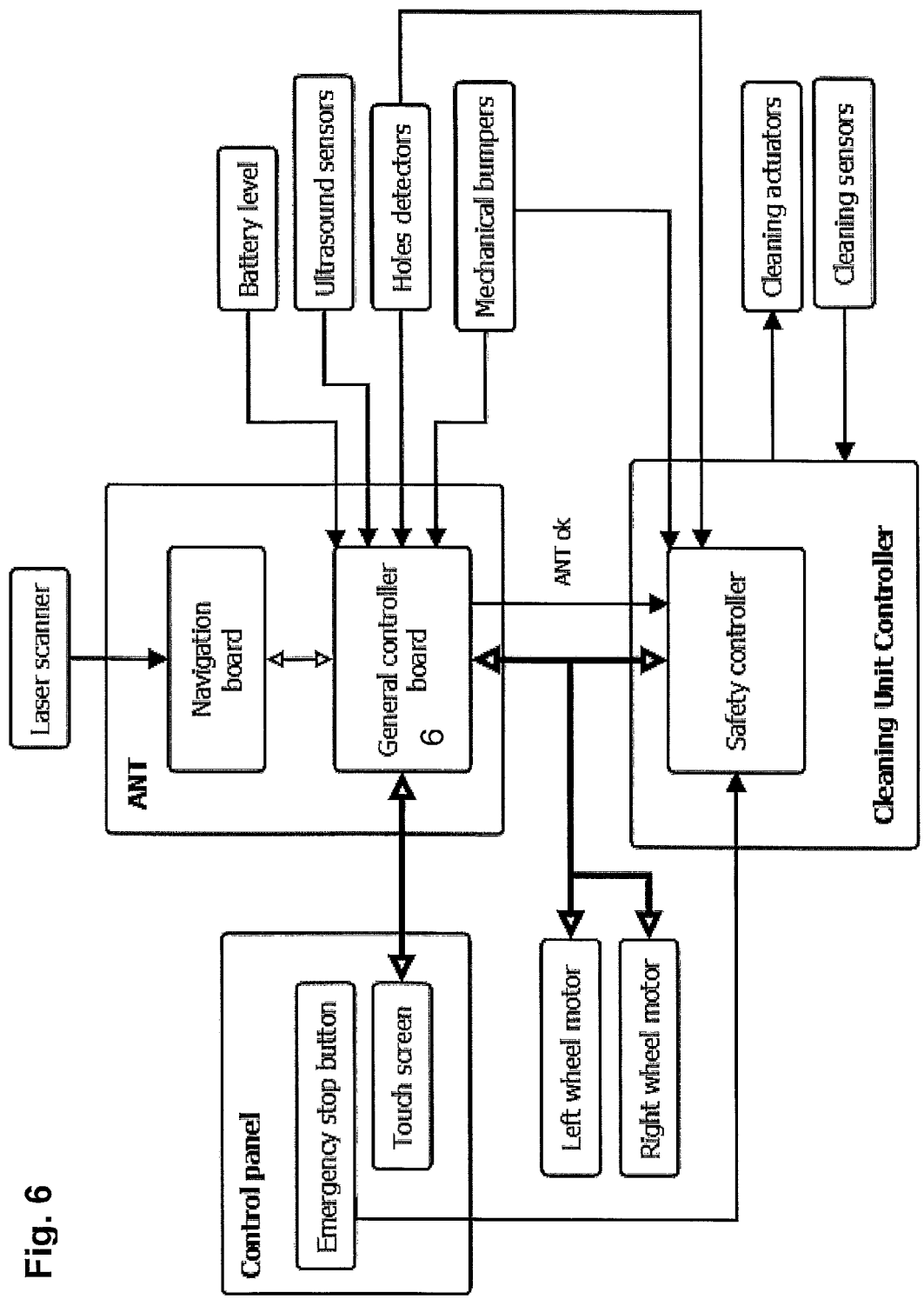
FIG. 6 shows a schematic compilation of the most important elements of the controller, of the sensors and of the drive of the automatic cleaning machine.
Figure 7:
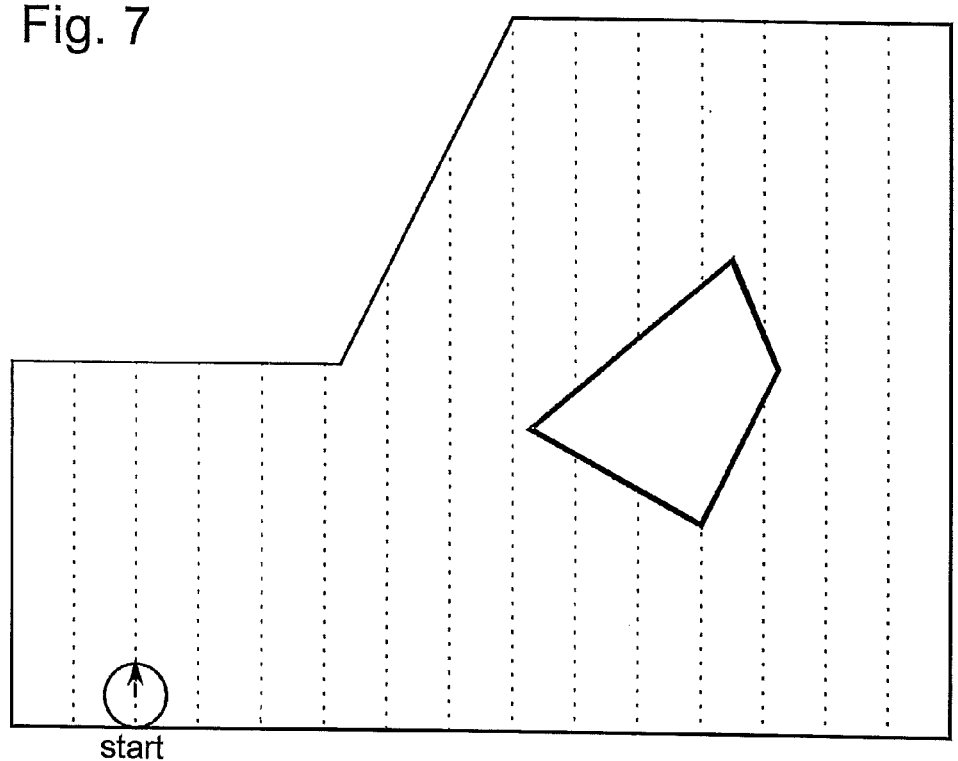
FIGS. 7 to 12 show schematic illustrations for floor treatment, which explain an example of a possible route by means of consecutive illustrations of the route, which has been driven at the respective points in time.

When solving the task, it was recognized that the mapping of the boundary of the floor surface can be foregone, when the route is not determined by means of a map. A simple and reliable selection of a successful route can be guaranteed with only a few driving and storing steps, wherein a route is successful, when it covers the entire floor surface, when it is as short as possible, and when it also works in response to variably placed obstacles. The boundary of the floor surface is treated as an obstacle and is thus always detected, when the floor treatment machine strikes against an area of the floor boundary. Obstacles and thus also the floor boundary, are preferably detected by means of distance measurements by a scan sensor of the floor treatment machine, wherein the scan sensor is arranged in particular in front of the drive wheels, substantially in the height area of the drive wheels. In the case of a preferred embodiment, a laser scanner is used, which covers and angular range of 270°.

So that obstacles or floor boundaries, which do not extend across the height area with the scan sensor, are also detected, other sensors are preferably also used for recognizing obstacles. The floor treatment machine comprises ultrasound sensors and/or infrared sensors, for example. The ultrasound sensors are preferably oriented such that they detect obstacles, which extend against the interior of the floor surface at a distance from the floor. The infrared sensors are preferably oriented towards the floor, so as to detect obstacles in the floor, in particular steps.

To recognize obstacles, the floor treatment machine can also comprise at least one contact sensor, wherein preferably at least one deflection sensor is arranged between a chassis and a housing area, which is located in the front in driving direction. When an obstacle now comes into contact with the housing area, which is located in the front, the obstacle is recognized, the floor treatment machine is stopped and the detected obstacle is bypassed.

In addition to the physical obstacles, the obstacles also comprise virtual obstacles, such as open doors, for example, which are not to be driven through. In the case of a preferred embodiment, the virtual obstacles are input into the floor treatment machine via a controller and have the same effect as physical obstacles.

The driving and storing steps according to at least one embodiment of the invention, comprises:

determining a treatment direction with a forwards and backwards orientation, providing driving lines, which are spaced apart from one another, perpendicular to the treatment direction, following route segments on driving lines from starting points to end points, determining opposite driving directions on adjacent driving lines, determining end points, when it is not possible to continue to drive on the respective driving line due to an obstacle, which is detected by an obstacle recognition device, storing the starting point as well as the end point of the route segment, which was followed and one of the states "completely treated" or "incompletely treated" as well as additionally storing a direction information at least in the case of "incompletely treated", wherein it becomes clear from the direction information, in which direction incompletely treated areas are present, starting at the corresponding end point, said storing being carried out for each end point and is made on a route segment storage, the contour-following movement, which is triggered at the end points for finding respective new starting points, in the case of which the floor treatment machine follows the obstacle, until it encounters a driving line, wherein the contour-following movement starts in the direction of the respective current orientation of the treatment direction, when encountering the driving line, which was followed prior to the contour-following movement, on a route segment, which, according to the route segment storage, has not yet been followed, a new starting point is determined at that location and the driving direction of this driving line is maintained, when encountering an adjacent driving line on a route segment, which, according to the route segment storage, has not yet been followed, a new starting point is determined at that location and the driving direction of the adjacent driving line is chosen, when encountering a driving line on a route segment, which, according to the route segment storage, has already been followed, the end of a group of route segments, which run next to one another, is determined, wherein the controller then looks for an end point comprising the state "incompletely treated" in the route segment storage and approaches it with a position search movement, so as to tackle a new group of route sections, which run next to one another, starting at this end point in the orientation of the treatment direction stored for this end point, until no end point comprising the state "incompletely treated" is present any longer.

For controlling the floor areas, which have already been passed over or which still need to be passed over, respectively, it is sufficient when the respective starting point as well as the end point of the route segment, which has been followed, and one of the states "completely treated" or "incompletely treated" as well as additionally a direction information at least in response to "incompletely treated" are stored for each end point on a route segment storage. The storage needs for storing the treated surface can be kept to be very small.

When driving along driving lines and during the contour-following movements, the current position and orientation of the floor treatment machine is provided by a position detection device. When driving along driving lines, it is examined, whether the current position information matches the positions on the current driving line. In the case of deviations, the driving movement is corrected accordingly. In the case of the contour-following movements, the current position information is used to detect the intersection with a driving line. Due to the fact that only the current or the next driving line can be intersected in response to the contour-following movements, only information for two driving lines must be kept at hand. When following the contour of an obstacle, the data relating to the obstacle or for detecting it, respectively, must also be used.

When, in response to a contour-following movement, the floor treatment machine intersects a driving line at an intersection, it must be examined, whether this intersection is located on a route segment, which has already been followed. For this purpose, the current information from the route segment storage can be used to examine, whether the intersection is located on a line between a pair of stored starting and end points. Due to the small data quantity of the route segment storage, the reading and comparing effort for examining the impact point with reference to the possible location thereof between stored starting and end points is very small.

When driving along driving lines and when carrying out contour-following movements, the demands on the storage size and on the computing power are small, because the current positions must only be related to line equations and to a small amount of point pairs.

In a preferred embodiment, the treatment direction and the driving lines perpendicular to the treatment direction are determined by positioning and orienting the floor treatment machine when starting a treatment mode. For this purpose, it can apply, for example, that the triggering of the start of the treatment mode confirms that the current orientation of the floor treatment machine corresponds to the orientation of a driving line and that the forwards orientation of the treatment direction runs so as to be oriented to the right, perpendicular to the driving line.

The person, who starts the automatic treatment mode, can thus determine the treatment direction anew for each treatment. Due to the required cleaning times for the entire floor surface in response to different treatment directions, for example, this person can then determine the best treatment direction. It is to be assumed that the best treatment direction runs parallel or perpendicular to a wall of the room, comprising the floor surface, which is to be cleaned. However, in the event that large adjustable elements comprising outer edges, which are oriented differently, are arranged in the interior of the room, it may be the case that a treatment direction, which is adapted to these elements, is optimal. The solution according to the invention has the advantage that, based on its experience and a rough assessment of the boundary and the location of the adjustable elements on the floor surface, the operating personnel can optimize the routes by cleaning with different treatment directions.

The state "completely treated" or "incompletely treated", which is to be assigned to a current end point, is preferably determined by means of the distance from the current end point to the closest starting point on a driving line, which is located in the current orientation of the treatment direction, directly before the driving line comprising the current end point, wherein the state "incompletely treated" is chosen in the case of a distance above a predetermined value. The predetermined value preferably corresponds at least to the expansion of the floor treatment machine transversely to its driving direction, so that "incompletely treated" is chosen when the floor treatment machine between the current end point and the closest starting point on a driving line before the driving line comprising the current end point has sufficient room for passing through. Due to the current orientation of the treatment direction, this possible pass-through is not yet sought. By means of the storage, which is carried out at the current end point, of the information "incompletely treated" and the direction information, from which it becomes clear, in which direction an incompletely treated area is present, starting at the current end point, the untreated area can be approached at a later point in time, starting at this end point in the changed direction.

A floor treatment machine or a method comprising the above-listed driving steps and stored information, respectively, can be operated successfully, when, if required, thus in particular when storing starting points and end points as well as in response to controlling the position and orientation relative to driving lines, the position and the orientation of the floor treatment machine can be determined.

According to the most general embodiment of the invention, a position and orientation detection device provides the current position and orientation upon request. Any position and orientation detection device, which is known from the state of the art, can thereby be used.

Total stations comprising an automatic target acquisition and target tracking (for example the standard product known as Leica iCON robot 50) are known from the surveying technology. In the event that such a total station is now arranged so as to be stationary in the area of the floor surface, which is to be treated, the floor treatment machine can obtain its position and orientation from the total station via a radio connection, if needed. In the event that the floor treatment machine comprises two prisms, for example, which can be traced by the total station and which are arranged so as to be offset on the upper side thereof, the position and orientation of the floor treatment machine can be determined from the positions of these two prisms.

Laser tracker-based position and orientation determinations (for example the 6DoF Leica Absolute Tracker AT901) are also known from the robot control. A laser tracker can be integrated in the floor treatment machine and ensures position and orientation determinations with a high accuracy.

It goes without saying that stationary position determination devices for detecting the floor treatment machine as well as measuring systems, which are arranged on the floor treatment machine and which follow stationary elements, can be used. Due to the fact that the view of identification marks on the ceiling is possible for the most part from a large room area, measuring systems arranged on the floor treatment machine, which are orienting themselves or the coordinate system, respectively, by identification marks on the ceiling, are suitable.

In a preferred embodiment, stationary components of the position and orientation detection device are foregone. This creates a completely autonomous device, which can be used on all kinds of floor surfaces, wherein individual fixed elements, such as wall sections bounding the floor surface or elements, columns, inner wall sections or fixed shelves, which are arranged on the floor surface and which are used as positioning areas, must be assigned to the floor surface. To provide for a position and orientation determination, the controller of the floor treatment machine ensures that a detection mode can be carried out, in which the detection of positioning areas can be carried out in a floor coordinate system, which is assigned to the floor surface, from distance measurements of the scan sensor and from drive information from the drive wheels.

Before a floor surface can be treated by the floor treatment machine, the floor treatment machine must be guided across different areas of the floor surface in the detection mode, so that the floor treatment machine can detect positioning areas. For detecting the positioning areas, the detection mode ensures that line segments can be determined in the floor coordinate system, wherein the determined line segments represent measured distance points at the positioning areas comprising parameters of curve equations as sections of continuous lines.

In the treatment mode, the floor treatment machine ensures that its position and orientation can be determined in the floor coordinate system from the detected positioning areas and the distance measurements from the scan sensor, which are detected for the current position. If necessary, driving information from the drive wheels is also used for determining a current position and orientation of the floor treatment machine. Based on an accurate position determination, which follows from a good correlation of at least two positioning areas, for example, and the distance measurements, which are detected for a current position, a relatively accurate position and orientation can also be determined while continuing the drive when following the route or with the drive information from the drive wheels, respectively, even if positioning areas are not visible when continuing the drive.

In a preferred embodiment, the controlling of the floor treatment machine takes the effective position relative to the wheels of the housing and/or the effective location of the treatment area into consideration and therefore passing by an obstacle, and guiding of the treatment area at the obstacle, are attained in an accurate way such that the treatment area passes as close to an obstacle as possible.

A preferred floor treatment device of at least one embodiment is embodied as cleaning device, preferably comprising at least one brush, a cleaning liquid supply and a suction arrangement, but if necessary comprising a dry vacuum, or a spray suction device or a sweeper. At least one tank and at least one pump must be provided for the cleaning liquid. Preferably, there is one tank for cleaning liquid or water comprising a cleaning agent, respectively, and one tank for the cleaning agent, which is added to the water. To be able to forego a frequent replacement of the cleaning liquid, a membrane is assigned to this tank. The membrane serves as flexible wall between fresh and dirty water, wherein the available space is divided for fresh and dirty water, as needed. The drive device comprises at least one battery and at least one drive motor. The controller comprises a display and an input device, preferably a touch screen. To be able to turn off the floor treatment machine quickly in case of an emergency, a well-visible emergency stop switch is also provided.

As an example for a floor treatment machine, FIGS. 1 to 3 and 5 show a cleaning machine 1 for treating floor surfaces, comprising a housing 2, two drive wheels 3, two pivotable support wheels 4, a drive device 5 in each case comprising a motor for each drive wheel 3, a controller 6 comprising a display and input device 7 in the form of a touch screen, at least one scan sensor 8, which ensures that distance measurements can be carried out in a substantially horizontal plane via a predetermined angular area and comprising a floor treatment device 9, which ensures that the floor can be treated in a treatment area comprising a predetermined location relative to the wheels 3, 4 as well as comprising a treatment width perpendicular to the driving direction.

The floor treatment device 9 of the illustrated cleaning machine comprises two or three replaceable brushes or pads 9a, which rotate about vertical axes, which are arranged so as to be laterally offset. The brushes 9a are rotated by a brush drive 9b. By means of a non-illustrated cleaning liquid supply, cleaning liquid is supplied in the area of the brushes 9a from a first tank 10 by means of a pump. From a second tank 11, cleaning agent can be introduced into the cleaning liquid. After the brushes 9a have treated the floor, cleaning liquid, which remains on the floor, is sucked up by a suction arrangement 12, and is supplied to the first tank 10. To be able to forego a frequent replacement of the cleaning liquid, a membrane, which keeps undesired components in the first tank 10, is assigned to the first tank. The electrical energy of all of the electrically operated components stems from at least one rechargeable battery 13, which can be connected to a charging device via a plug 13a. The extraction arrangement 12 is preferably arranged on the chassis 14 so as to be slightly pivotable via an updating connection 12a, so that the suction arrangement 12 is always assigned to the wet floor area, even when driving around curves.

Due to the fact that the brushes 12 are arranged so as to be slightly offset to one side relative to a central axis in driving direction of the cleaning machine, the cleaning takes place on this side substantially into the area comprising the drive wheel 3. So that the drive effect of the drive wheel 3 is not impacted by the cleaning liquid, a scraper 15 deflects the cleaning liquid against the center of the cleaning machine 1.

So that obstacles or wall boundaries, which do not extend across the height area with the scan sensor 8, are also detected, other sensors are preferably also used for recognizing obstacles. In the illustrated embodiment, a plurality of ultrasound sensors 16 are arranged in the front area of the housing 2, wherein the arrangement on two different heights and the possibility of transmitting ultrasound pulses from any ultrasound sensor 16 and to receive them at any ultrasound sensor 16, ensures a good detection of obstacles, which extend at a distance to the floor towards the interior of the floor surface. Obstacles in the floor, in particular stairs, are detected by means of two infrared sensors 17, which are in each case arranged laterally on the front and which are oriented towards the floor.

To recognize obstacles, provision is also made for at least one contact sensor 18 in the form of a deflection sensor, which is arranged between the chassis 14 and a housing area 2a, which is located in the front in driving direction. In the event that an obstacle now comes into contact with the housing area 2a, which is located in the front, the obstacle deflects the housing area 2a relative to the chassis 14, which is detected by the deflection sensor.

To obtain easy access to the interior of the cleaning machine for maintenance work, the chassis 14 is connected via a pivot connection 19 to a housing bracket 20 for holding the housing area 2a, which is located in the front. Spring connections 21, which hold the housing area 2a, which is located in the front, in a position of equilibrium, from which said housing area 2a is deflected when coming into contact with an obstacle, are arranged between the housing bracket 20 and the housing area 2a, which is located in the front, wherein the contact sensor 18 between the housing bracket 20 and the housing area 2a, which is located in the front detects this deflection. So that the scan sensor 8 has an unobstructed view in the scan area, the housing area 2a encompasses a passage slot 2b. A warning lamp and/or an emergency stop switch 22 are/is arranged on the upper side of the housing 2.

FIG. 6 shows that the controller 6 is connected substantially to all of the sensors and drives. For the navigation, the controller 6 (general controller board) is connected to a "navigation board", which, in the illustrated embodiment, is connected directly to the scan sensor "laser scanner". It goes without saying that navigation solutions can also be used, which operate without a scan sensor (for example positioning by means of total stations or laser trackers), wherein the scan sensor "laser scanner" is then connected directly to the controller 6 for detecting obstacles.

For detecting obstacles, the controller 6 is connected to at least one sensor from the group of scan sensor "laser scanner", ultrasound sensor "ultrasound sensors", infrared sensor "holes detectors", contact sensor "mechanical bumpers". In the event that an obstacle or an emergency situation, respectively, is only detected by means of the contact sensor "mechanical bumpers", the infrared sensor "holes detectors" or the emergency stop switch, it is advantageous when these elements are connected directly to a safety controller "safety controller", which can trigger an immediate stop of the drive wheels, so as to avoid damages. The safety controller and the controller 6 are connected to one another and to the drive device, wherein the drive device preferably comprises one motor each for both drive wheels.

The controller 6 is connected to the display and input device "touch screen". In the illustrated embodiment, the controller for the floor treatment device 9 is arranged in a cleaning controller "cleaning unit controller", which is connected to the controller 6 and to the actuating elements "cleaning actuators" and sensors "cleaning sensors" of the floor treatment device 9.

FIGS. 7 to 12 use an example to describe the significant steps and the information of a possible route, which is to be stored, wherein the figures illustrate consecutive situations of the floor treatment. The flow chart of FIG. 13 combines the controls, decisions and driving steps, which are minimally required for the routes.

At the beginning of the floor treatment or of a route (FIG. 7), respectively, the desired treatment direction is determined with forwards and backwards orientation, preferably by positioning and orienting the floor treatment machine at the start of the treatment mode. For this purpose, it can be determined, for example, that the floor treatment machine stands so as to be oriented on a driving line and that the forwards orientation of the treatment direction runs perpendicular to the driving line so as to be oriented towards the right. On the route, it must be possible to provide information for three driving lines, which are located next to one another, for controls, decisions and for values, which are to be stored. The driving lines (dotted lines in FIG. 7) are located next to one another at predetermined intervals and are preferably fixed as straight lines or by means of linear equations, respectively, in the floor coordinate system.

When the floor treatment machine is on its way on a driving line in the treatment mode, these driving lines and the driving lines, which are arranged on both sides, are identified as prior, current and next driving line, arranged in the forwards orientation of the treatment device. En route, the floor treatment machine drives route segments on the driving lines from starting points to end points, wherein the driving direction of the route segments, which immediately follow each other, on different driving lines is always fixed in opposite direction. The end points are determined when proceeding on the respective driving line is not possible due to an obstacle. The starting points are determined as points on a driving line, in the case of which the floor treatment machine starts to pass over a route segment on this driving line. By storing the coordinates of the starting and end points, the treated area of the floor surface can be recorded.

Figure 8:
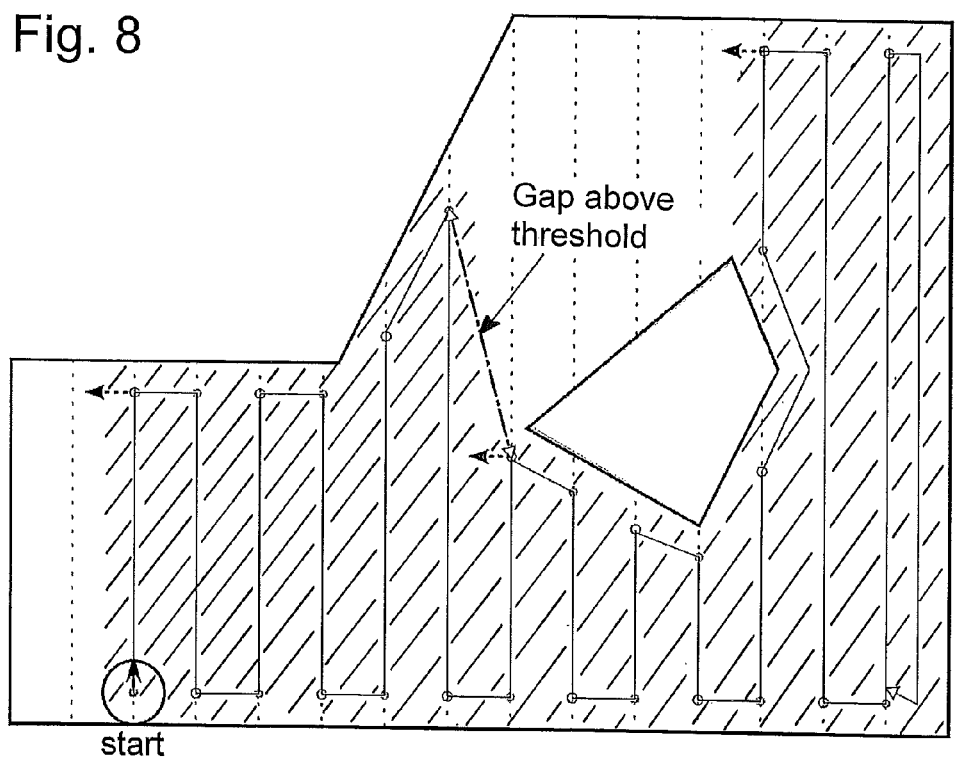
Figure 13:
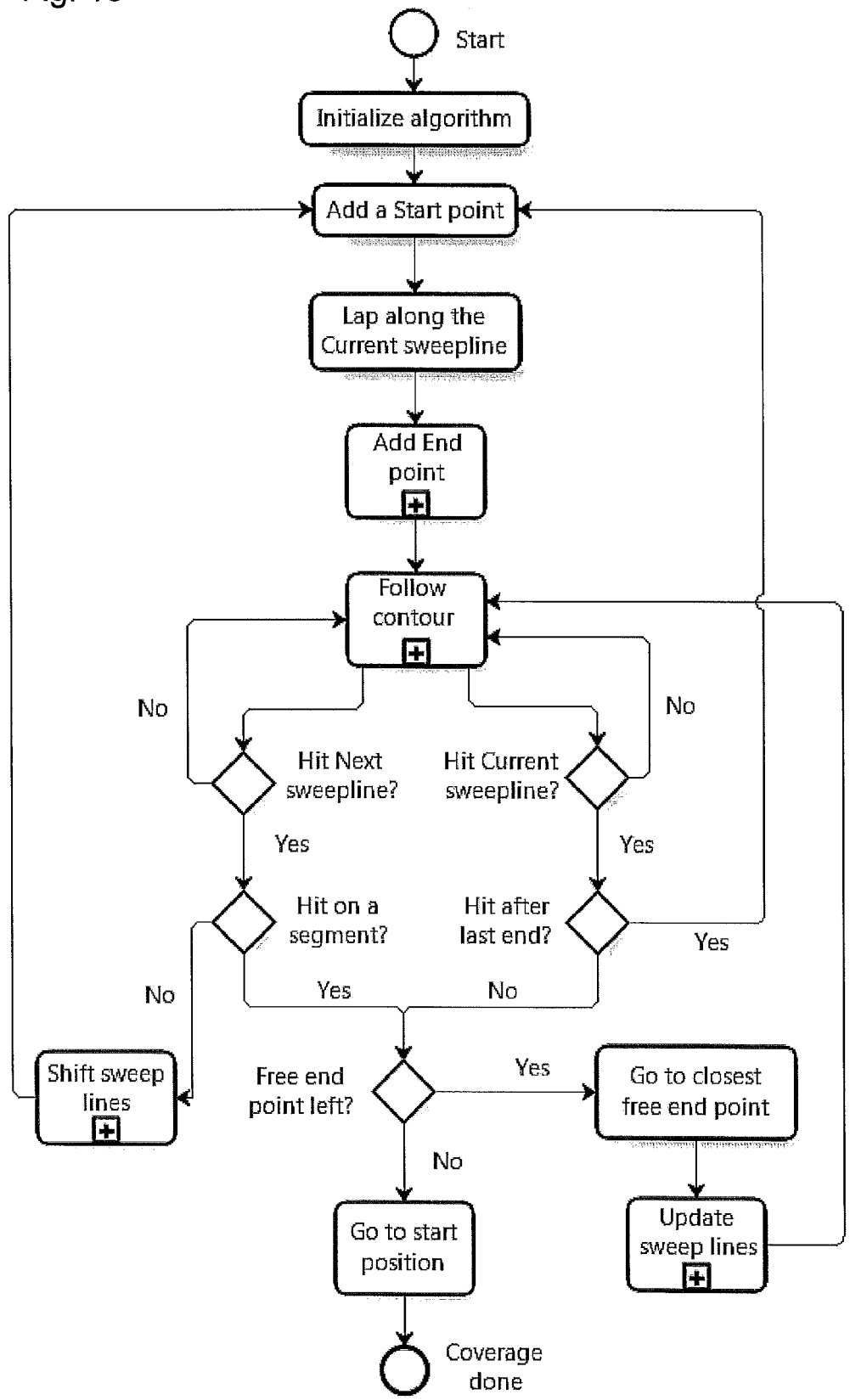
FIG. 13 shows a flow chart for the floor treatment according to FIGS. 7 to 12.

According to the initialization step "initialize algorithm", which is listed in FIG. 13, with the determination of the treatment direction, the starting point is determined as starting point "add a start point" and is stored. In FIG. 8, the starting points are illustrated as filled points. Starting at the first starting point, the first route segment is driven on the current driving line, which is identified in FIG. 13 with "lap along the current sweepline". When striking an obstacle, one end point on the current driving line is determined and stored, which is illustrated in FIG. 13 with "add end point" and in FIG. 8 with circular points. In addition to the coordinates of the end point, the determination and storing of one of the states "completely treated" or "incompletely treated" also belongs to the storing of the end point and, in the case of "incompletely treated" the storing of a direction information also belongs thereto, wherein it follows from the direction information, in which direction incompletely treated areas are present, starting at the corresponding end point.

In the event that an area of the floor surface, which has not yet been treated, can be approached in the direction, which is opposite to the current orientation of the treatment direction, the distance from the current end point to the closest starting point on the prior driving line is located above a predetermined pass-through distance, which corresponds substantially to the minimally required width of an area, which can be passed over by the floor treatment machine. Starting at the end point of the first route segment in FIG. 8, no starting point is found on the prior driving line, because the prior driving line was not passed over. The distance from the first end point to a point, which is nonexistent, is determined so as to be larger than the predetermined pass-through distance and, accordingly, the state "incompletely treated" is stored for the first end point with the information that the area, which has not yet been treated, must be approached from the current end point with an orientation of the cleaning direction, which is opposite to the current treatment direction, which is illustrated in FIG. 8 with the arrow, which points to the left, in the case of the first end point.

The obstacle, which is encountered at an end point, in each case triggers a contour-following movement, which is identified in FIG. 13 with "follow contour". During the contour-following movement, the floor treatment machine follows the obstacle in the direction of the respective current orientation of the treatment direction, until it encounters the current or the next driving line. This is identified in FIG. 13 with "hit current sweepline?" or with "hit next sweepline?", respectively. At the location, where the contour-following movement encounters a location of a driving line, which has not yet been passed over, a new starting point is determined (FIG. 13, "add a start point"). In the event that the new starting point is located on the current driving line or on the driving line, over which the contour-following movement passes, respectively, the driving direction of this current driving line is maintained. In the event that the new starting point—based on the driving line, which is passed over prior to the contour-following movement—is located on the next driving line, this next driving line becomes the current driving line and the driving direction is rotated by 180° or is directed in opposite direction, respectively, as compared to the prior driving line. In addition, the driving line prior to the contour-following movement becomes the prior driving line and a new next driving line is determined, which is identified in FIG. 13 with "shift sweep lines".

According to FIG. 8, the floor treatment machine always encounters the next driving line in response to the contour-following movement, which follows the first 10 end points, and, accordingly, the route segments, which immediately follow one another on the driving lines, always have opposite driving directions. The end points are first provided by the boundary of the floor surface. Accordingly, the distances between the end points and the respective closest starting point on the respective prior driving line are smaller than the predetermined pass-through distance, so that the state "completely treated" is stored at these end points. The seventh end point is provided by an obstacle, which is marked in black, on the interior of the floor surface. In the case of this seventh end point, the distance to the closest starting point on the prior driving line is larger than the predetermined pass-through distance, which is identified with "gap above threshold". Accordingly, the state "incompletely treated" is stored for the seventh end point with the information that the area, which has not yet been treated, must be approached from the current end point with a cleaning direction, which is opposite the current orientation of the treatment direction, which is illustrated in FIG. 8 by means of the arrow, which points to the left, at the seventh end point.

Starting at the eleventh end point, the contour-following movement impacts the current driving line again after the obstacle, which is marked in black. Accordingly, the new route segment on the current driving line leads to the next or twelfth end point, respectively. In the case of this twelfth end point, the distance to the closest starting point on the prior driving line is larger than the predetermined pass-through distance. Accordingly, the state "incompletely treated" comprising the direction information according to the arrow, which points to the left in FIG. 8, is stored for the twelfth end point.

The contour-following movement, which follows the fourteenth end point, only encounters a route segment, which has already been treated. A section of a driving line, which has not yet been passed over, cannot be found. It follows from this that the first group of route sections, which run next to one another, has been completed.

All of the created groups of route sections, which run next to one another, are treated consecutively, in that an end point comprising the state "incompletely treated" is always sought at the end of such a group and is approached with a position search movement. Preferably, the closest end point comprising the state "incompletely treated" is chosen, which is identified in FIG. 13 with "go to closest free end point". FIG. 13 illustrates this iterative treatment with the term "is free end point left". At an end point comprising the state "incompletely treated", a current, a prior and a next driving line is determined in each case (FIG. 13, "update sweep lines") and, starting at this end point into the direction stored for the end point, a new group of route sections, which run next to one another, is tackled until no end point comprising the state "incompletely treated" is present anymore. The entire floor area has then been treated and the floor treatment machine moves to the starting point (first start point). In FIG. 13, this is identified with "go to start position" and "coverage done".

Figure 9:
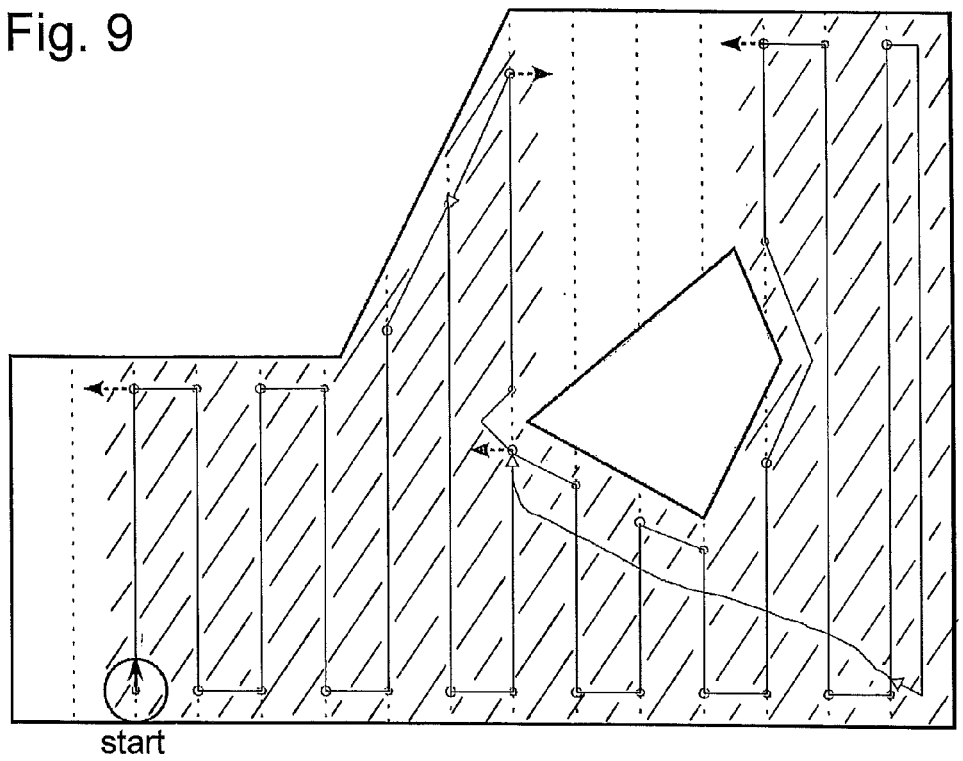
Figure 10:
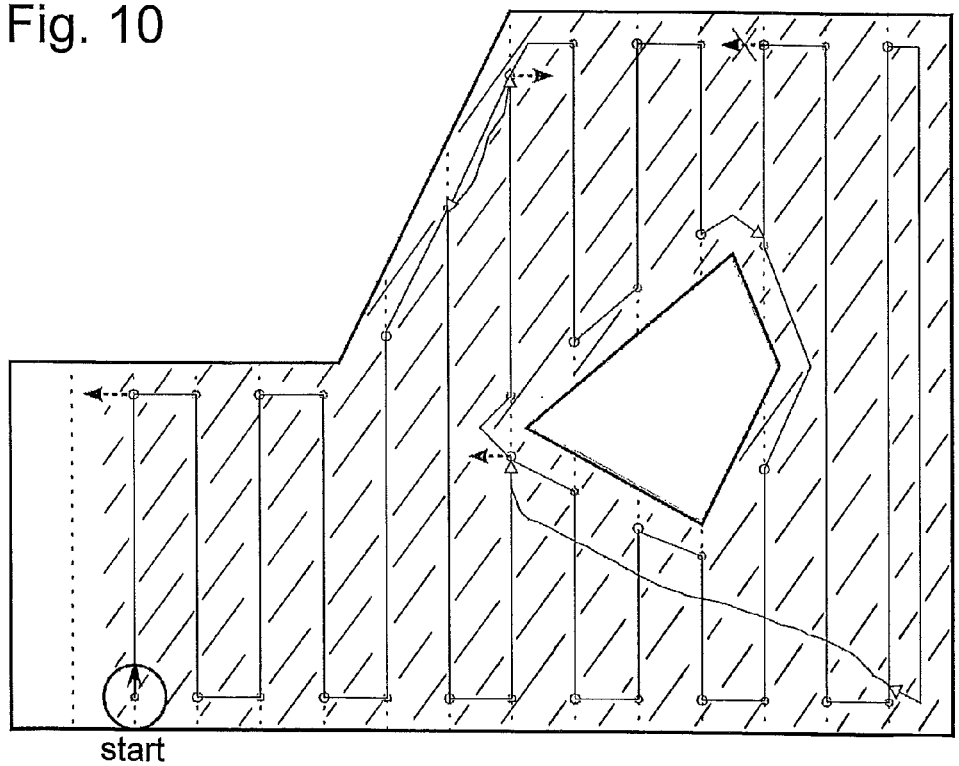
Figure 11:
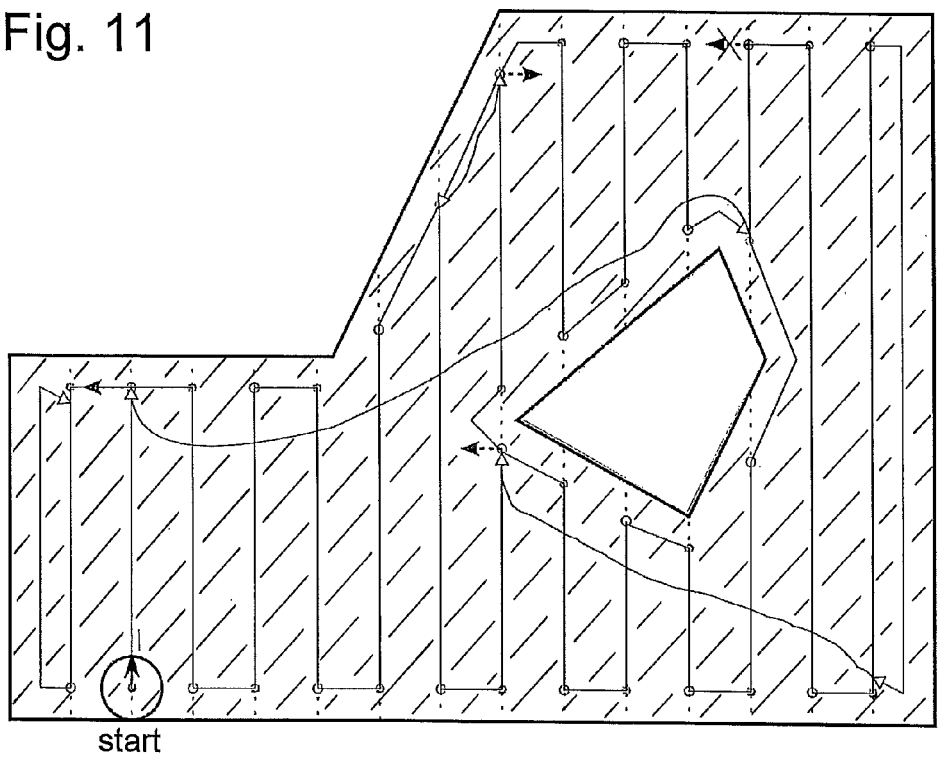
Figure 12:
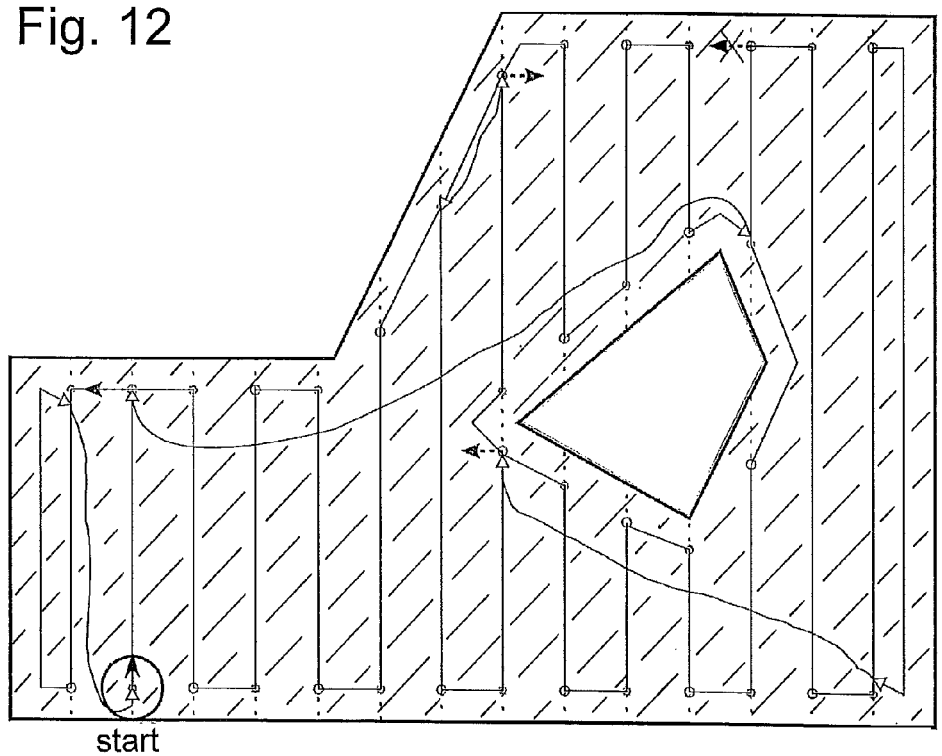

Passing over the further groups of route sections, which run next to one another, is illustrated in FIGS. 9 to 12. It is illustrated in FIG. 9, how, starting at the seventh end point, the contour-following movement comprising the orientation of the treatment direction, which is marked towards the left, after the obstacle, which is marked in black, encounters the current driving line again. The new route segment on the current driving line accordingly leads to the next end point, at which the distance to the closest starting point on the driving line located on the right or on the prior driving line, respectively, is larger than the predetermined pass-through distance. Accordingly, the state "incompletely treated" is stored for this end point with the direction information according to the arrow, which points to the right in FIG. 9. After the subsequent contour-following movement, the floor treatment machine encounters a route segment, which has already been treated, and, according to the FIG. 10, moves to the closest end point comprising the state "incompletely treated". From there, the area above the obstacle, which is marked in black, is treated, and because the last contour-following movement arrives at a next driving line, which has already been treated with the same orientation of the treatment direction, the state of the end point, which is located at the upper end can be shifted to "completely treated" according to FIG. 11 and the last end point comprising the state "incompletely treated", namely the first end point, can be approached. FIG. 12 shows that the entire floor surface has been treated after the treatment of the floor area to the right of the starting point of the floor treatment.

The position search movements between the groups of route segments, which are located next to one another, are in each case illustrated in FIGS. 9 to 12 by means of hand-drawn lines. For the point, which is to be approached, an advantageous route between starting and end points is in each case calculated, wherein hitting obstacles causes bypassing these obstacles.

To ensure the complete treatment of a floor surface, only a few data, namely the starting and end points of the route segments, which are passed over, and a treatment state comprising direction information at the end points must be stored. In addition, no route must be planned except for the few position search movements, which are to be calculated roughly, which leads to a minimum calculating effort.

Figure 14:
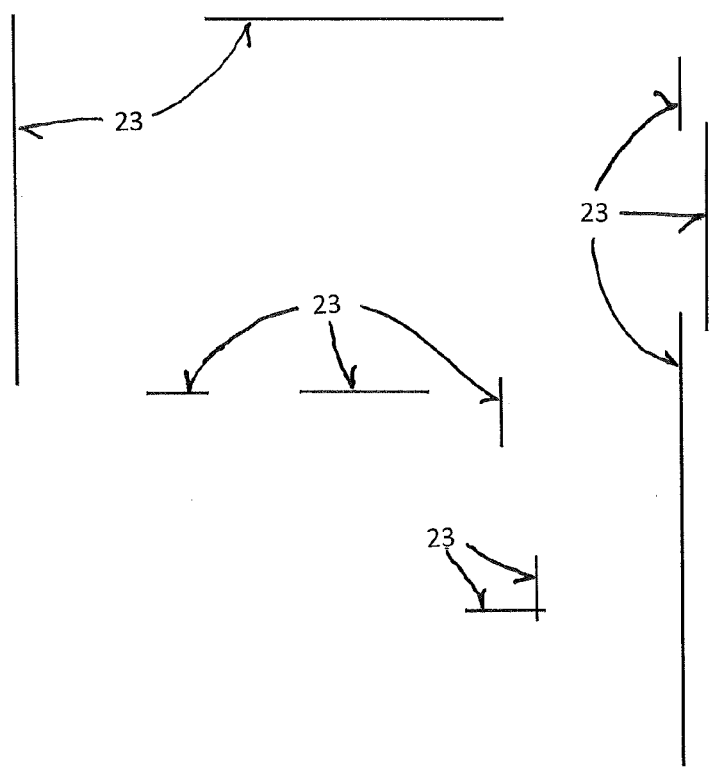
FIG. 14 shows line segments, which are illustrated in a coordinate system and which are determined in a detection mode from distance measurements from the scan sensor and driving information from the drive wheels to positioning areas.
Figure 15:
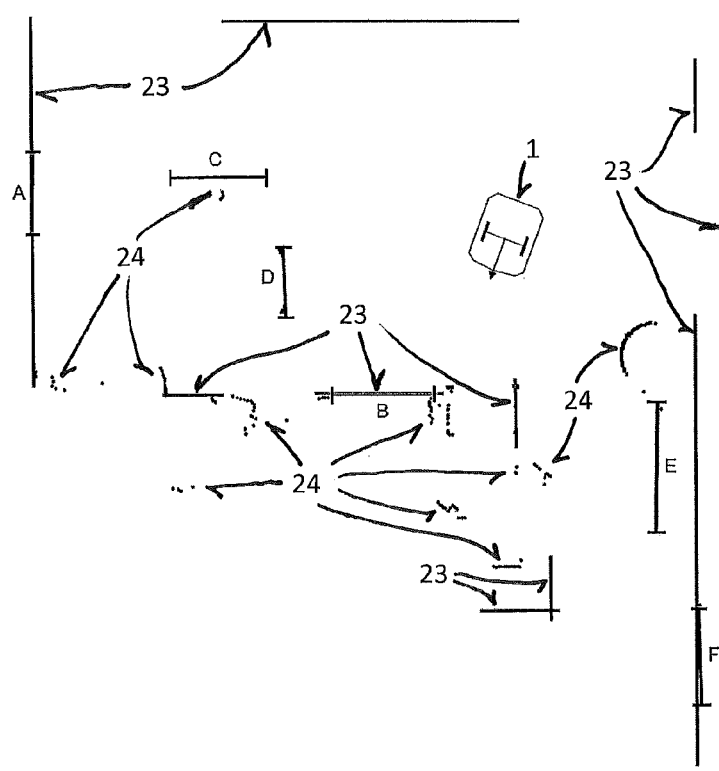
FIG. 15 shows line segments according to FIG. 14, which are illustrated in a coordinate system, and distance points detected from an indicated position of the floor treatment machine, which overlap the line segments, and the lines of currently present elements, which can be placed through the distance points.

FIGS. 14 and 15 represent steps, which are carried out by an embodiment, which foregoes stationary components of the position and orientation detection device. Individual fixed elements, such as the wall sections, which border the floor surface, or elements, columns, inner wall sections or fixed shelves, which are arranged on the floor surface, and which are used as positioning areas, are assigned to the floor surface.

To provide for a position and orientation determination, the controller for the floor treatment machine comprises a detection mode, in the case of which the positioning areas 23, which are illustrated in FIG. 14 on a floor coordinate system, which is assigned to the floor surface, are determined from distance measurements of the scan sensor and from driving information from the drive wheels. Before a floor surface can be treated by the floor treatment machine, the floor treatment machine must be guided across different areas of the floor surface in the detection mode, so that it can detect positioning areas 23. To detect the positioning areas 23, the detection mode determines line segments in the floor coordinate system, wherein the determined line segments represent measured distance points at the positioning areas 23 comprising parameters of curve equations, preferably straight lines, as sections of continuous lines. The illustrated sections of straight lines can be determined at angles to a coordinate axis and with position information as well as length information or also with the coordinates of the end points.

FIG. 15 shows the overlapping of detected positioning areas 23 with the distance measurement of the scan sensor, which are detected for a current position, wherein distance points, which are located on a line, in particular a straight line, are illustrated with line sections A, B, C, D, E and F. Other distance points are indicted by dots 24. From the illustrated correspondence of the line sections A, B and F with positioning areas, the position and orientation of the floor treatment machine 1 can be determined in the floor coordinate system in the treatment mode. The line sections C, D and E originate from variable elements (obstacles), which were not present when carrying out the detection mode. If applicable, driving information from the drive wheels is also used to determine a current position and orientation of the floor treatment machine. All of the information, which can be used to determine the position, is preferably converted into a position and orientation determination with error estimation by means of Kalman filter technology. Based on an accurate position determination, which follows from a good correlation of at least two positioning areas, for example, and the corresponding distance measurements, which are detected for a current position, a relatively accurate position and orientation can also be determined while continuing the drive when following the route or with the drive information from the drive wheels, respectively, even if positioning areas are not visible when continuing the drive.

The invention claimed is:

1. A floor treatment machine for treating floor surfaces, comprising:
   a housing;
   two drive wheels;
   at least one support wheel;
   a drive device;
   a controller;
   at least one obstacle-recognizing device; and
   a floor treatment device, configured to ensure that the floor can be treated in a treatment area comprising a predetermined location relative to the wheels, and including a treatment width perpendicular to the driving direction, wherein the controller encompasses a treatment mode, the treatment mode being configured to ensure that a surface, which is to be treated, can be swept over by way of the treatment area of the treatment machine by groups of route sections, which run next to one another, wherein the position and orientation of the floor treatment machine in the floor coordinate system are provided by a position detection device, the treatment mode further being configured to ensure that a treatment direction with a forwards and backwards orientation is determinable and that a current orientation of the treatment direction is one of the forwards and backwards orientation,
   determine driving lines, which are spaced apart perpendicular to the treatment direction, wherein the distances are chosen such that, when driving in opposite directions on driving lines, which are located next to one another, the area between the driving lines is completely treated by the treatment area,
   ensure that route segments on the driving lines are drivable from starting points to end points each in one driving direction, wherein the driving directions on adjacent driving lines are oriented in opposite direction,
   determine the end points in that driving cannot be continued on the respective driving line due to an obstacle, which is detected by the obstacle recognition device,
   store, in a route segment storage, the starting point and the end point of the route segment, which was followed, and for the end points, at least one of the states "completely treated" or "incompletely treated" and a direction information, at least in the case of "incompletely treated", wherein it becomes clear from the direction information, in which orientation of the treatment direction incompletely treated areas are present, starting at the corresponding end point, and
   ensure that a contour-following movement is triggered at the end point on a current driving line for finding a new starting point, that the contour-following movement starts in the current orientation of the treatment direction and that during the contour-following movement the floor treatment machine follows the obstacle until it encounters the current or a next driving line,
wherein
   when encountering the current driving line, which was followed prior to the contour-following movement, on a route segment, which, according to the route segment storage, has not yet been followed, a new starting point is determined at that location and the driving direction of this driving line is chosen,
   when encountering the next driving line on a route segment, which, according to the route segment storage, has not yet been followed, a new starting point is determined at that location and the driving direction of this adjacent driving line is chosen,
   when encountering a driving line on a route segment, which, according to the route segment storage, has already been followed, the end of a group of route segments, which run next to one another, is determined, wherein the controller then looks for an end point comprising the state "incompletely treated" in the route segment storage and approaches it with a position search movement, so as to tackle a new group of route sections, which run next to one another, starting at this end point with the current orientation of the treatment direction being set according to the direction information stored for this end point, until no end point comprising the state "incompletely treated" is present any longer.

2. The floor treatment machine according to claim 1, wherein the treatment mode is configured to ensure that the state "completely treated" or "incompletely treated", which is to be assigned to a current end point, is determinable by way of the distance from the current end point to the closest starting point on a driving line, which is located in the orientation, which is opposite to the current orientation of the treatment direction, directly next to the driving line comprising the current end point, and wherein the state "incompletely treated" is chosen in the case of a distance above a predetermined value.

3. The floor treatment machine according to claim 1, further comprising at least one scan sensor, configured to ensure that distance measurements can be carried out in a substantially horizontal plane via a predetermined angular area, and that the treatment mode ensures that obstacles can be detected via distance measurements from the scan sensor.

4. The floor treatment machine according to claim 3, wherein the floor treatment machine comprises the position detection device, wherein the controller is configured to ensure that, in a detection mode, the detection of positioning areas, which are assigned to the floor surface, is detectable in a floor coordinate system, which is assigned to the floor surface, from distance measurements from the scan sensor and driving information from the drive wheels, wherein line segments are determined in the floor coordinate system for detecting the positioning areas and the determined line segments represent measured distance points of the positioning areas comprising parameters of curve equations as sections of continuous lines, and the controller is configured to ensure that, in the treatment mode, the position and the orientation of the floor treatment machine can be determined by the line segments, which are determined in the detection mode, and by way of the distance measurements from the scan sensor, which are detected for the current position, wherein route information from the two drive wheels can preferably also be used and all of the information is converted into a position and orientation determination with error estimation.

5. The floor treatment machine according to claim 3, wherein the scan sensor is arranged in front of the drive wheels substantially in the height area of the drive wheels.

6. The floor treatment machine according to claim 1, wherein the floor treatment machine comprises at least one of ultrasound sensors and infrared sensors, by which obstacles are detectable, wherein the treatment mode ensures that obstacles are detectable via measurements from the at least one of ultrasound sensors and infrared sensors.

7. The floor treatment machine according to claim 6, wherein the infrared sensors are oriented towards the floor so as to detect obstacles in the floor.

8. The floor treatment machine according to claim 1, wherein the floor treatment machine comprises at least one contact sensor and the treatment mode ensures that the obstacles are also detectable via measurements from the at least one contact sensor.

9. The floor treatment machine according to claim 8, wherein at least one deflection sensor is arranged between a chassis and a housing area, which is located in the front in driving direction.

10. The floor treatment machine according to claim 9, wherein the chassis is connected via a pivot connection to a bracket for holding the housing area and spring connections, which hold the housing area in a position of equilibrium, from which said housing area is deflected when coming into contact with an obstacle, are arranged between the bracket and the housing area, wherein at least one deflection sensor is arranged between the bracket and the housing area, which is located in the front, for detecting this deflection.

11. The floor treatment machine according to claim 1, wherein, in addition to the physical obstacles, the obstacles also comprise virtual obstacles, wherein the virtual obstacles are inputtable via the controller before starting the treatment mode and cannot be passed over in the treatment mode and thus have the same effect as physical obstacles.

12. The floor treatment machine according to claim 1, wherein the treatment direction and the driving lines are determined perpendicular to the treatment direction by positioning and orienting the floor treatment machine when starting the treatment mode, and wherein it is determined that the floor treatment machine stands so as to be oriented on a driving line and that the forwards orientation of the treatment direction runs perpendicular to the driving line so as to be oriented towards the right.

13. The floor treatment machine according to claim 1, wherein at least one of the effective expansion of the housing and the effective location of the treatment area relative to the wheels is considered and in light of the effective distance measurements to an obstacle allows passing by an obstacle as accurate as possible.

14. The floor treatment machine according to claim 1, wherein the floor treatment device is a cleaning device.

15. The floor treatment machine according to claim 14, wherein the cleaning device comprises at least one brush, a cleaning liquid supply and a suction arrangement.

16. A method for treating floor surfaces via a floor treatment machine including a housing, two drive wheels, at least one support wheel, a drive device, a controller, at least one obstacle-recognizing device and a floor treatment device, configured to ensure that the floor is treatable in a treatment area including a predetermined location relative to the wheels, and including a treatment width perpendicular to the driving direction, the method, in a treatment mode, comprising:

sweeping over a surface using the floor treatment machine by groups of route sections, which run next to one another, wherein position and orientation of the floor treatment machine in the floor coordinate system are provided by a position detection device, the method, in the treatment mode, further comprising determining a treatment direction with a forwards and backwards orientation and selecting a current orientation of the treatment direction from the forwards and backwards orientation, determining driving lines, spaced apart perpendicular to the treatment direction, wherein the distances are chosen such that, when driving in opposite directions on driving lines, which are located next to one another, the area between the driving lines is completely treated by the treatment area, driving route segments on the driving lines from starting points to end points each in one driving direction, wherein the driving directions on adjacent driving lines are oriented in opposite direction, determining the end points in that driving cannot be continued on the respective driving line due to an obstacle, detected by an obstacle recognition device, storing the starting point and the end point of the route segment, which was followed, in a route segment storage and for the end point, at least one of the states "completely treated" or "incompletely treated" and at least in the case of "incompletely treated" also a direction information is stored, wherein it becomes clear from the direction information, in which orientation of the treatment direction incompletely treated areas are present when starting at the corresponding end point, triggering a contour-following movement at the end point on a current driving line for finding a new starting point by the floor treatment machine starting in the current orientation of the treatment direction and following the obstacle until it encounters the current or a next driving line, wherein when encountering the current driving line, which was followed prior to the contour-following movement, on a route segment, which, according to the route segment storage, has not yet been followed a new starting point is determined at that location and the driving direction of this driving line is chosen, when encountering the next driving line on a route segment, which, according to the route segment storage, has not yet been followed, a new starting point is determined at that location and the driving direction of this adjacent driving line is chosen, and when encountering a driving line on a route segment, which, according to the route segment storage, has already been followed, the end of a group of route segments, which run next to one another, is determined, wherein the controller then looks for an end point comprising the state "incompletely treated" in the route segment storage and approaches with a position search movement, so as to tackle a new group of route sections, which run next to one another, starting at this end point with the current orientation of the treatment direction being set according to the direction information stored for this end point, until no end point comprising the state "incompletely treated" is present any longer.

17. The method according to claim 16, wherein the treatment mode is configured to determine the state "completely treated" or "incompletely treated", which is to be assigned to a current end point, by way of the distance from the current end point to the closest starting point on a driving line, which is located in the orientation, which is opposite to the current orientation of the treatment direction, directly next to the driving line comprising the current end point, wherein the state "incompletely treated" is chosen in the case of a distance above a predetermined value.

18. The method according to claim 16, wherein the floor treatment machine comprises at least one scan sensor, configured to ensure that distance measurements can be carried out in a substantially horizontal plane via a predetermined angular area and wherein, in the treatment mode, the obstacles are detected via at least one of distance measurements from the scan sensor, via distance measurements from ultrasound sensors, via measurements form infrared sensors, via measurements from contact sensors and via virtual objects, input before the start of the treatment mode.

19. The method according to claim 18, wherein the position detection is carried out by the floor treatment machine, wherein in a detection mode, the controller carries out the detection of positioning areas, which are assigned to the floor surface, in a floor coordinate system, which is assigned to the floor surface, from distance measurements from the scan sensor and driving information from the drive wheels, wherein line segments are determined in the floor coordinate system for detecting the positioning areas and the determined line segments represent measured distance points of the positioning areas comprising parameters of curve equations as sections of continuous lines, and in the treatment mode, the controller determines the position and the orientation of the floor treatment machine by way of the line segments, which are determined in the detection mode, and by way of the distance measurements from the scan sensor, which are detected for the current position.

20. A computer program product, configured to perform the method of claim 16 when the computer program product is run on a program-controlled floor treatment machine.

* * * * *